United States Patent [19]

Farrell

[11] 4,363,619

[45] Dec. 14, 1982

[54] APPARATUS FOR MAKING WIDE MOUTH CONTAINER

[75] Inventor: John J. Farrell, Greenbrook, N.J.

[73] Assignee: Farrell Patent Company, Middlesex, N.J.

[21] Appl. No.: 172,735

[22] Filed: Jul. 28, 1980

[51] Int. Cl.³ .............................. B29C 17/07
[52] U.S. Cl. .................. 425/525; 264/503; 264/537; 425/526; 425/533
[58] Field of Search ............. 264/503, 537; 425/525, 425/526, 533; 215/1 C

[56] References Cited

U.S. PATENT DOCUMENTS

| | | | |
|---|---|---|---|
| 3,279,501 | 10/1966 | Donald | 264/312 X |
| 3,339,231 | 9/1967 | Piotrowski | 425/533 |
| 3,470,282 | 9/1969 | Scalora | 264/537 X |
| 3,809,517 | 5/1974 | Schneider | 425/533 |
| 3,986,806 | 10/1976 | Beyerlein | 425/533 X |
| 4,009,980 | 3/1977 | Armour et al. | 425/533 X |
| 4,122,138 | 10/1978 | Cleereman et al. | 425/533 X |

*Primary Examiner*—Jan H. Silbaugh
*Attorney, Agent, or Firm*—Marvin Feldman; Stephen E. Feldman; Jules L. Chaboty

[57] ABSTRACT

A method and apparatus for blow molding a wide mouth container wherein substantially the entire container is multiaxially oriented in its formation. The method and apparatus produce this container in effectively a one station operation without the need for high pressure injection molding platens. The apparatus is useful in making non-oriented articles as well. One such multiaxially oriented article that may be blow molded is a container having the configuration of an oil can.

8 Claims, 6 Drawing Figures

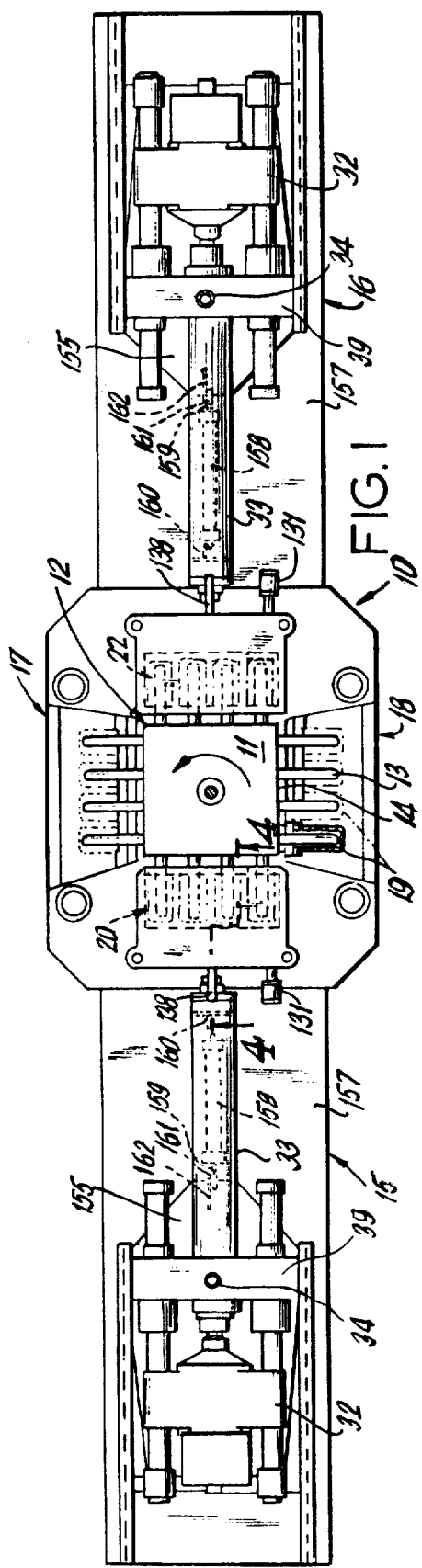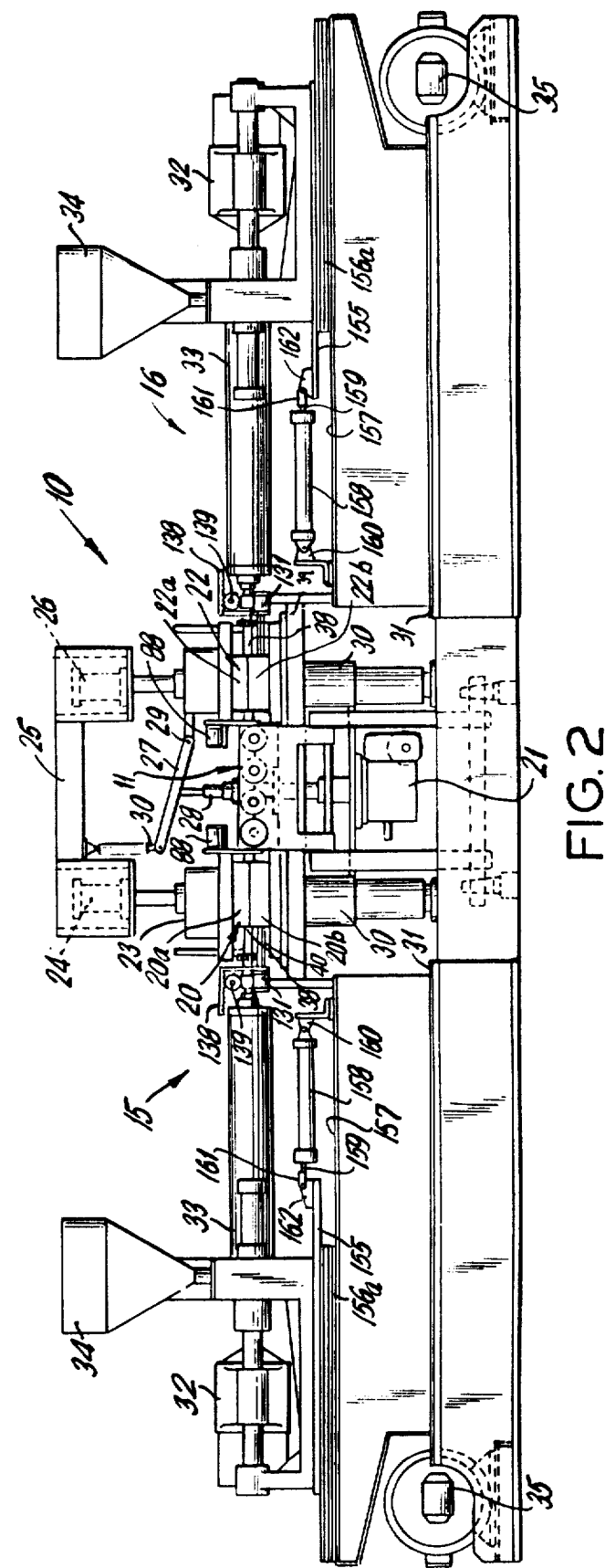

APPARATUS FOR MAKING WIDE MOUTH CONTAINER

This invention relates to blow molding wide mouth hollow articles from thermoplastics. Specifically, this invention relates to blow molding a multiaxially oriented wide mouth container, such as one having the configuration of an oil can.

Heretofore in injection blow molding an injection blow molded parison was formed wherein the neck portion was formed and held in place while the body portion underwent multiaxial orientation in blow molding. The finished hollow article of course was not oriented at the neck portion.

Further in the prior art it was often difficult to blow mold a wide mouth container as such, required an unusually large diameter core rod and parison. A large diameter core rod in turn necessitated large area injection molding platens capable of withstanding the high injection pressures.

Still further, often several sequential operations were required to blow mold a multiaxially oriented large container, which operations required transfer to and from several distinct operation stations.

Thus the prior art was dissuaded from developing relatively large mouth blow molded containers wherein essentially the entire container is multiaxially oriented.

Now there is provided by the present invention a method and apparatus for blow molding a wide mouth container which may be multiaxially oriented without the need for large injection molding platens, and without the need for several operation stations.

It is therefore an object of this invention to provide a method and apparatus for making an essentially entirely multiaxially oriented wide mouth container.

It is another object of this invention to provide a method and apparatus for blow molding a wide mouth container, which may be multiaxially oriented, wherein the container is formed within one station.

It is still another object of this invention to provide a method and apparatus for injection blow molding a wide mouth container wherein the need for high pressure injection platens is obviated.

It is still a further object of this invention to provide an injection blow molded container wherein a helicoidal orientation is imparted in the formation of the container.

It is still a further object of this invention to provide a method and apparatus to form a wide mouth helicoidally oriented container wherein the mandrel is rotatable and the mold portion encompassing the parison is also rotatable.

It is still a further object of this invention to provide an apparatus and method as immediately aforesaid wherein the core rod and said parison mold portion is rotatable in opposite directions to impart a double and criss-crossing helicoidal orientation to the blow molded container.

It is still a further object of this invention to provide a method and apparatus to injection blow mold a wide mouth container, wherein the core rod is internally temperature controlled and the parison mold encompasses the outside of the parison and contacts the parison in its formation, and further contacts the parison in part in the formation of the container; said parison mold is also internally temperature controlled, for blow molding the container within its orientation temperature range.

It is still a further object of this invention to provide a machine wherein a wide mouth injection blow molded container is formed at one station and the container is stripped from the core rod at a second station.

It is still a further object of this invention to provide a machine as immediately aforesaid in which two forming stations are opposed to each other and two stripping stations are opposed to each other on opposite sides of a core rod indexing turntable so that multiple production is achieved with one machine.

It is still a further object of this invention to provide multiple parallel molds between platens at the single forming station, insofar as normally high injection pressures between platens is obviated, so that a plurality of wide mouth containers may be formed at a single station.

The aforesaid as well as other objects and advantages which will become more apparent in a reading of the construction and operation as more fully described hereinafter, and claimed, reference being had to the accompanying drawings forming a part hereof, and in which:

FIG. 1 is a plan view of a machine embodying the invention;

FIG. 2 is an elevational view of the machine of FIG. 1;

Figure 3:
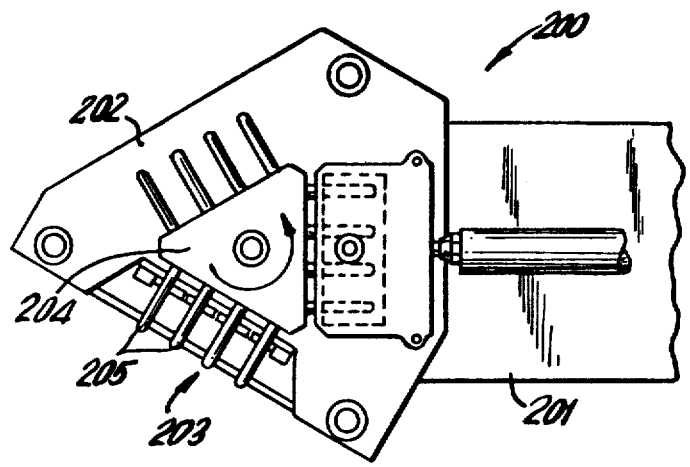
FIG. 3 is a plan view of another machine embodying the invention.

Referring now to FIGS. 1 and 2 there is shown the apparatus of this invention generally designated as 10. An indexing turntable 11 comprises a square horizontally rotatable indexing head 12, supportedly mounting four core rods 13 on each vertical face 14 of head 12, said indexing head being operable by an indexing mechanism in the well known manner. Each face 14, and the core rods 13 on each face, is opposed to and indexed at an operation station. As shown, two similar container forming stations 15 and 16 are disposed 180° on opposite sides of head 12, and two similar container stripping stations 17 and 18 are disposed 180° on opposite sides of head 12. In this manner a container 19 formed at station 15 is then stripped from a core rod 13 at station 18, and the now free core rod is indexed to station 16 whereat another container is formed, and thereafter said another container is stripped from the core rod at station 17 in the conventional manner. Again the free core rod is indexed, this time to its initial station 15 to repeat the four station cycle (double).

Each container forming station comprises a partible container blow mold 20 and 22. The blow molds may be identical or dissimilar wherein the former case double production of a single design is achieved, whereas in the latter case production of two container designs is achieved with a single machine.

In the following description, the apparatus of stations 15 and 18 will be described; it being understood that stations 16 and 17 respectively have similar elements.

Mold 20 is of partible construction comprising a movable upper platen 20a and a stationary lower platen 20b. Platen 20a is mounted to clamp 23 which is hydraulically operated by cylinder 24 in the well known manner. Cylinder 24 is interconnected by tie bar 25 to cylinder 26 for station 16, so that the molds at the respective stations are actuated simultaneously. An indexing table lift bar 27 is pivotally interconnected to spline 28 of the indexing head 12, and is pivoted at 29 and 30, so that the with the raising and lowering of the movable clamp sections, the indexing head is raised and lowered one-half the distance. This permits the container on the core rod at the forming station to be cleared free of the bottom stationary mold so as to permit horizontal rotation by means 21.

The container blow molds are supportedly mounted on a mold table 30 which is fixed to frame 31. Frame 31 extends away from the turntable and supports a thermoplastic feed hopper 34, plasticizer 32, and screw extruder 33 mounted thereon, for each station 15 and 16. The plasticizers and extruders of station 15 and 16 may be electrically interconnected so that the forming of the fluent thermoplastic at said stations is done simultaneously. Auxiliary features for operation of this apparatus such as hydraulic pump motor 35 may also be conveniently mounted to frame 31.

In the present construction, the extruder barrel 37 is formed with an exceptionally long nozzle 38, which nozzle is supported by a bearing 39 which in turn is mounted to frame 31 by brackets 40. Nozzle 38 interfits with parison mold 41, for purposes more fully explained hereinafter.

Figure 6:
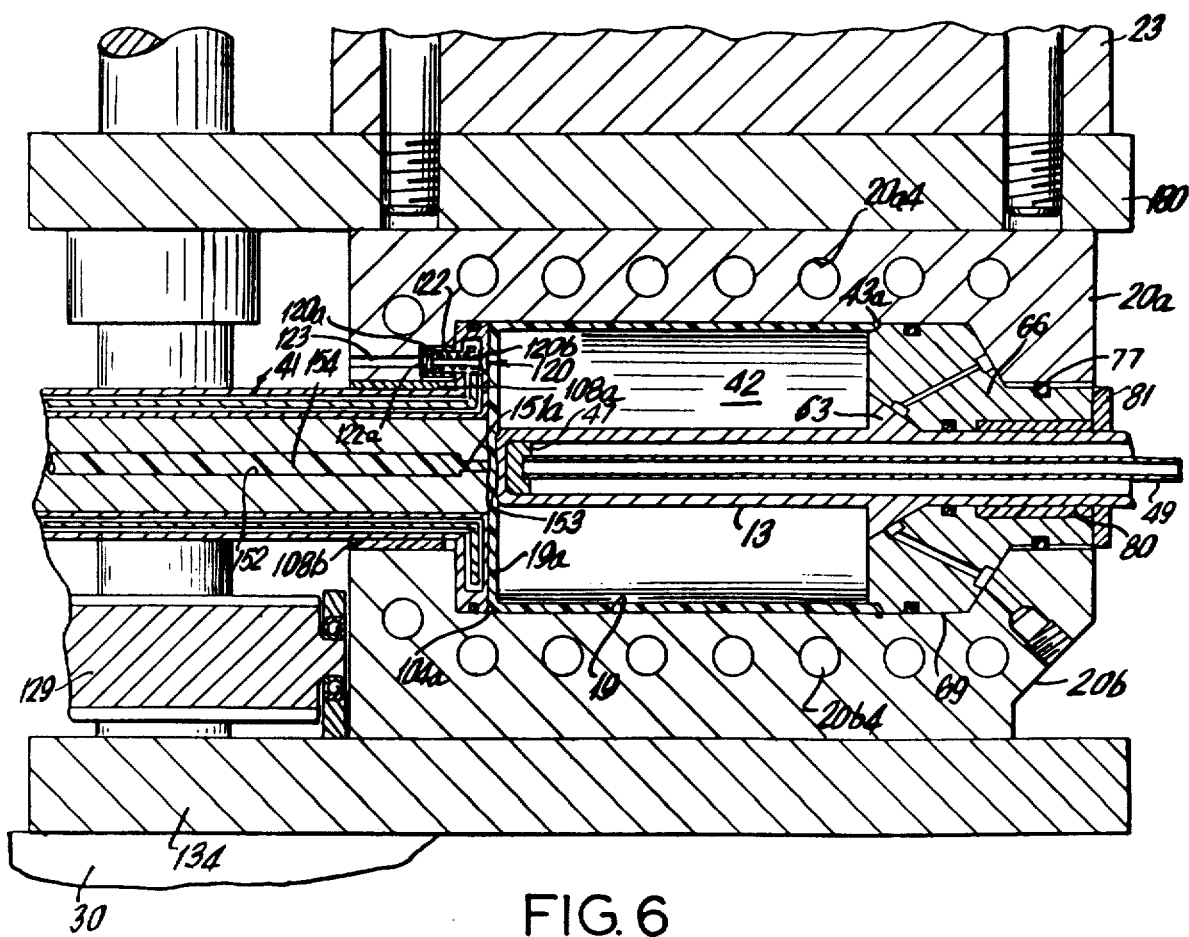
FIG. 6 is a partial enlarged sectional view as in FIG. 5, but showing the formed container, before opening the mold.
Figure 4:
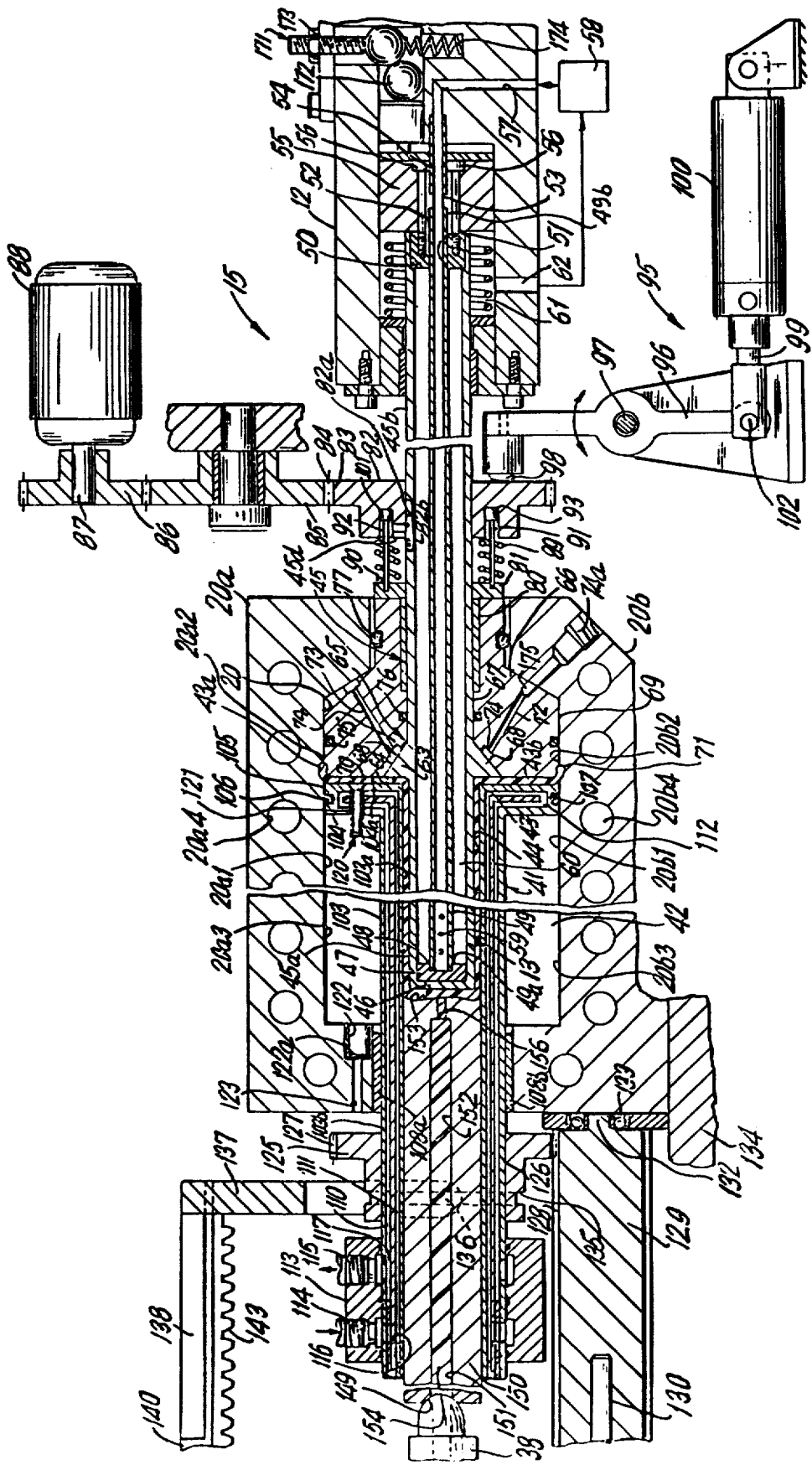
FIG. 4 is an enlarged sectional view taken along line 4—4 of FIG. 1, showing the formation of the parison.
Figure 5:
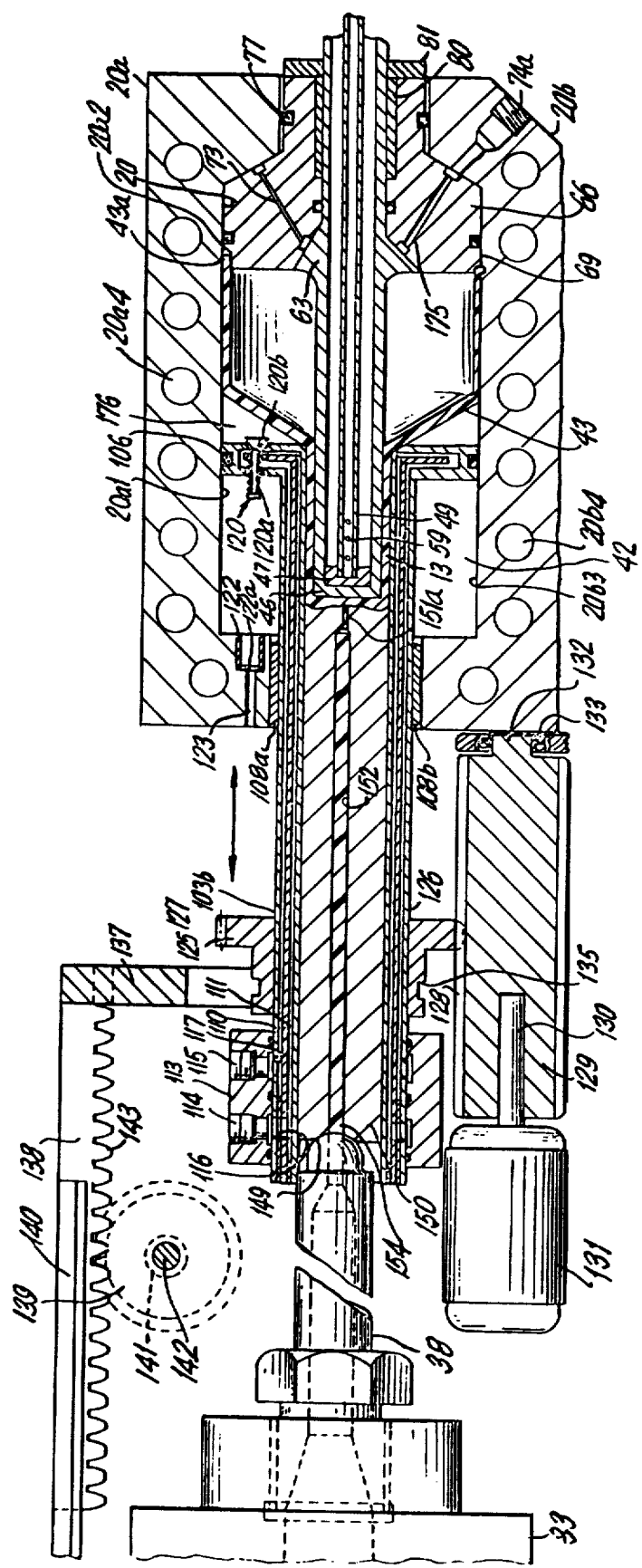
FIG. 5 is a partial enlarged sectional view as in FIG. 4, but showing the partial formation of the container.

Referring now specifically to FIGS. 4-6, there is shown the general construction of mold 20 with core rod 13 and parison mold 41 disposed within the cavity 42 of mold 20. In FIG. 4, a parison 43 is shown being formed in the cavity 44, said cavity being formed between parison mold 41 and core rod 13, and in FIG. 6, a container 19 formed from parison 43, is shown within the mold cavity 42, before the mold 20 is opened.

Core rod 13 comprises a tubular housing 45, having a free or unsupported end portion 45a, and an end portion 45b supported on indexing head 12. Tubular housing 45 is formed with closed end wall 46 with plug 47 seated on the interior surface of wall 46. Plug 47 is formed with a central recess 48 for receiving one end 49a of axially mounted tube 49. The other end 49b of tube 49 is supported axially mounted in central hole 51 by plug 50. Tube end opening 52 is in end face opposition with end opening 53 of fluid supply pipe section 54. Pipe section 54 and tube 49 are coaxial and both housed within block 55, and block 55 is in turn bolted to plug 50 by bolts 56. Pipe section 54 communicates with channel 57 which in turn is connected to a temperature conditioning fluid supply source 58.

At the end 49a of tube 49, a series of small orifices 59 are formed in the tube 49 which permits communication of the inside of tube 49 with the annular channel 60 formed between the inside of housing 45 and the outside of tube 49. An outlet orifice 61 is formed through and at underside of tube 49, which orifice 61 communicates with channel 62 in head 12, which channel 62 in turn communicates with fluid supply 58 for the return, heat exchange and recycle of the temperature control fluid.

In this manner of construction, temperature control fluid such as water at the appropriate temperature is supplied by 58, through elements 57, 54, 52, through the inside of tube 49, then through orifices 59, through annular channel 60, and out 61, 62 and returned to supply 58. The core rod 13 is thus conditioned to an appropriate temperature or more specifically the core rod 13 cools the parison to a temperature at which orientation may be imparted to the parison 43.

Housing 45 is formed with an integral annular flange 63, which flange comprises a right angular wall 64 and a contiguous oblique wall 65.

A neck ring 66 is formed with a central tapered opening 67 having an oblique wall portion 68, which wall portion 68 faces flange portion 65. The peripheral cylindrical wall 69 of ring 66 is shaped to accommodate the container wall portions 20a1 and 20b1 of mold sections 20a and 20b, when the molds are closed. Ring 66 is also formed with a wall portion 70 and with oblique wall portion 68 contacting flange portion 65; ring wall portion 70 being contiguous with flange wall 64. In this manner contiguous wall portions 64 and 70 form a wall against which parison 43 is injection molded. In addition ring 66 is formed with an outer peripheral groove 71 which is contiguous with container mold wall grooves 20a2 and 20b2, with the molds closed. The contiguous surfaces of grooves 71, 20a2 and 20b2 form the cavity to form the mouth or rim 43a of the parison 43. Mouth 43a essentially retains its dimensional integrity in blow molding the container. It is to be borne in mind that the groove construction holds the parison lip 43a in place during subsequent expansion of the parison.

Ring 66 is formed with a pair of through holes 72 and 73. At the ends of the through holes 72, 73 there are formed a pair of annular grooves 74 and 75, which interconnect the through holes 72 and 73. Groove 75 at hole 72 mates with blow air inlet nozzle 74 which is formed in and mounted to fixed mold section 20b. A series of circular o-rings 75, 76 and 77, provides a fluid tight seal for the blow air so that blow air from nozzle 74a is distributed by groove 75 through holes 72 and 73 to groove 74 between oblique walls 68 and 65 to act on parison 43. Of course a minimal space must be provided between walls 68 and 65 to permit this air flow, as will be more fully discussed hereinafter.

A bushing 80 with flange portion 81 is mounted to ring 66, and provides sliding engagement of the core rod housing. A core rod gear 82 is also mounted on core rod housing 45, in a manner to permit the rotation of the gear to rotate the core rod in any desired direction. Gear 82 is formed with peripheral teeth 83 which mesh with the teeth 84 of intermediate gear 85, which in turn is driven by drive gear 86 which drive gear is mounted to the rotary shaft 87 of drive motor 88.

The core rod 13 is rotated by key 82a of gear 82 contacting set screw 45d so as to impart rotation to the core rod. Key 82a is formed with two opposed parallel walls (e.g. wall 82b of FIG. 4) so that set screw 45d is slidable therein, and also is capable of contacting either wall to impart rotation in opposite directions. Rotation of the core rod may be initiated by motor 88 at any point in the injection or blow molding cycle. It is of course particularly desirable to rotate the core rod after the parison has been conditioned to its orientation temperature. However core rod rotation for other purposes such as by way of example, assisting flow of the thermoplastic material in injection molding is also within the contemplation of this invention.

A pair of springs 89 and 90 provide resilient mounting between ring 66 and the core rod gear 82. The springs 89, 90 are slidably mounted on pins 91 and 92 respectively, which pins slip fit into annular recess 93 of gear 82, so that rotation of the gear and core rod is not imparted to the ring 66.

A trigger assembly 95 comprises a shaft 96 pivoted at intermediate pin 97, and being formed with a knob 98 at one end and being pivotally connected at pin 102 to ram 99 of air cylinder 100 at the other end. The actuation of cylinder 100 causes the retraction of ram 99, in turn causing the pivoting of shaft 96 so that knob 98 pressingly engages gear 82 so that gear 82 slides on housing 45, and pins 91, 92 contactingly press against the bottom wall 101 or recess 93, so that the sliding action is transmitted through pins 91 and 92 to ring 66. Ring 66 slides by bushing 80 along housing 45 to effect a mating of oblique walls 68 and 65 thereby closing the air inlet passage while permitting the mating of walls 64 and 70 in preparation to injection molding the thermoplastic material against walls 64 and 70 to form portion 43b of the parison body.

After the parison is formed and blow molding is commenced, cylinder 100 is deactivated so that the fluid pressure holding ram 99 is released, and springs 89 and 90 are free to expand the return the core rod gear 82 to its original position as shown in FIG. 4.

Turning now to a discussion of the parison mold 41, said parison mold is formed with a long cylindrical portion 103 and an integral flange portion 104. Parison mold 41 is mounted so as to be coaxial with core rod 13 and the inner cylindrical face 103a of portion 103 is radially spaced from the outside surface of core rod housing portion 45a, so as to form the parison mold cavity 44. Inner annular wall 104a is spaced from and opposes contiguous mating walls 64 and 70 so as to permit parison portion 43b to be formed therebetween. Further outer cylindrical wall 105 is in sliding relationship of container mold walls 20a3 and 20b3, and a Teflon gasket 106 is mounted in annular recess 107 of flange 104, to permit sliding movement of the flange 104 with the mold walls 20a3, 20b3 without marring said mold walls.

A split mating bushing 108a, 108b is mounted in the respective mold sections 20a and 20b so as to permit the cylindrical wall 103b to both slide and rotate in said bushing 108a, 108b.

A pair of parallel annular channels 110 and 111 are formed within portions 103 and 104, and said channels are interconnected by annular channel 112 within flange portion 104. A flange member 113 is mounted on cylindrical wall 103b at the end of portion 103 remote from flange 104. Member 113 is formed with a temperature conditioning fluid inlet nozzle 114 and a temperature conditioning fluid outlet nozzle 115. Nozzle 114 communicates with channel 116 which in turn communicates with channel 111 and nozzle 115 communicates with channel 117 which in turn communicates with channel 110. In this manner of construction a temperature conditioning fluid, such as cooling water, enters nozzle 114 and flows in series through 116, 111, 112, 110, 117 and out nozzle 115, so as to condition the parison and particularly the outer regions of the parison, to the desired temperature.

A spring-loaded, self-regulating valve 120 is mounted in sleeve 121, which sleeve in turn is transversely mounted in flange 104. Portion 120a of valve 120 extends into the container mold cavity. The seated valve head 120b faces the parison portion 43b. A cup 122 is fixedly mounted in mold portion 20a and a through hole 123 communicates the bottom hole 122a of cup 122 with the ambient condition outside the mold. Hole 123 is coaxial with valve 120, and valve portion 120a seats in cup 122 when the parison mold is fully withdrawn as shown in FIG. 6.

In the aforesaid manner of construction, the parison mold cavity between the parison mold and the core rod and ring 66, is free to communicate with the ambient air through valve 120, at the desired pressure. Valve 120 is generally preset to maintain a desired pressure on the parison, is more particularly to prevent a vacuum pull on the parison as the parison mold is withdrawn from the mold cavity.

A gear 125 is formed with a central opening 126 which is fixedly mounted on cylindrical portion 103b. Gear 125 is formed with teeth 127 which interengage teeth 128 of drive gear 129 which drive gear is mounted on rotary shaft 130 of drive motor 131. Drive gear 129 is formed with support shaft 132 which is mounted within bearings 133. The bearings 133 are in turn mounted on lower die shoe 134 which in turn is mounted to the mold table 30.

Gear 125 is formed with a peripheral slot 135, which slot receives a interengaging key 136 of flange 137. Flange 137 is fixedly mounted to rack and pinion 138,139. The rack 138 is of telescoping construction 140 which cooperates with telescoping motor 141 at hub 142 of gear 139. In this manner motor 141 is actuated to cause gear 139 to rotate and engage teeth 143 of rack 138. The rotary movement of gear 139 is related to the telescoping movement of 140 in 138, or more accurately rack 138 is pulled by gear 139 over member 140. This movement of rack 139 of course moves flange 137 and in turn slides the parison mold 41 in bushing 108a, 108b.

The motor 141 is controlled so as to move the parison mold from the initial injection molding position as shown in FIG. 4, through the intermediate blow molding position as typically shown in FIG. 5, to the final fully molded container position as shown in FIG. 6. The timing and rate of this parison mold transitional movement is of course dictated in part by the characteristics of the particular container under construction.

In addition to the translational movement, the parison mold is also capable of undergoing rotational movement by means of motor 131 causing the gear to rotate in any desired direction, in turn causing rotation of the parison mold. Key slot 135 permits such rotation with or without simultaneously translational movement.

Thus what is shown is a combination of apparati wherein the parison may be rapidly conditioned to its orientation temperature, and then the parison may be worked by rotation of the core rod and/or parison mold, and then with translation of the parison mold and actuation of the neck ring, the parison in blow molded with or without continued working of the parison. The blow molding is faciliated by valve 120.

One interesting aspect of this construction is that the parison mold flange 104, and more particularly wall 104a, forms part of the container mold wall in forming the bottom of the container 19. It is to be noted that wall 104a may be formed with an annular recess (not shown) so that the bottom of the container is formed with a reinforcing rib.

Turning now to a discussion of the injection molding construction element, there is shown injection nozzle 38 is fixedly mounted in recess 149 of stationary nozzle bar 150. Bar 150 is slidably mounted within parison cylindrical mold wall 103a, so that the parison mold is free for both rotational and translational movement on bar 150. Bar 150 is formed with a central conduit 151 which is coaxial with nozzle passageway 152, for transport of the fluent thermoplastic material. Conduit 151 terminates at orifice 156 of wall 153 which opposes end wall 46 of the core rod. Fluent thermoplastic material 154 passes from injection nozzle 38 through bar 150, out orifice 156 and into the mold cavity 44 to form the parison 43, and then portions 43b and 43a.

Referring to FIG. 2, the screw extruder 33, plasticizer 32 and hopper 34 are mounted on base 155 which is slidable within track 156a. Track 156a is bolted to top 157 of frame 31. An air cylinder 158 having retractably extensible ram 159 is mounted to top 157 by bracket 160. End 161 of ram 159 is connected to bracket 162, which in turn is mounted to base 155. With the retraction and extension of ram 159, base 155 is caused to slide in frame 156, causing extruder 33 to likewise move. Nozzle 38 and bar 150 are also moved with the movement of the extruder 33. Specifically the immediately aforesaid movement causes wall 153 to move from the injection molding position of FIG. 4 to the container forming position of FIG. 6. In FIG. 6, wall 153 is shown as being contiguous with flange wall 104a and said contiguous walls forming the bottom wall of the container mold for forming bottom portion 19a of container 19.

After injection molding is complete and prior to blow molding of container 19, the extruder 33 sucks back the fluent thermoplastic in bar 150, and a break in the thermoplastic occurs at the conduit section 151a.

The pressure of the injection molding operation is generally about several thousand psi, and the force exerted on the core rod 13 is taken up by adjustable stop 171 in the indexing head 12. Further, with the injection pressure on the core rod, the core rod spacing between wall 153 and the end of the core rod housing 45 must remain about the same. Therefore there is an adjustable stop 171 mounted in the indexing head and acting through force transmission balls 172 onto block 55 and the core rod 13, assures that the core rod is properly positioned in the parison mold 41, juxtaposed to bar 150. Spring 170 resiliently mounts the adjustable stop 171 in acting on the core rod. Bolt 173 acting on balls 172 and spring 174 permits adjustment of the axial position of the core rod 13 in parison mold 41 with relation to face 153 of bar 150.

Referring now to FIG. 5, there is shown the parison 43 undergoing blow molding. Specifically, ring 66 is shown in the retracted position so that an air inlet 175 is provided between ring wall 68 and flange wall 64. Parison mold 41 is shown undergoing translational movement in a partially retracted position that a portion of the parison body is exposed to the mold cavity walls 20a3 and 20b3. The parison body, and in particular former portion 43b thereof, is shown in contact with walls 20a3, 20b3.

In the retraction of the parison mold 41, and more particularly flange 104, a vacuum tends to form between the parison and the flange. To overcome this tendency self-regulating valve 120 is actuated causing valve head 120a to lift permitting ambient air to flow through 123, 122a, into the mold cavity, through valve 120 into space 176 thereby providing a suitable counterbalance pressure to the blow molding pressure to ensure a smooth even blowing of the parison. Further the air entering 176 also serves to free the parison body from cylindrical wall 103a so as to prevent the parison from sticking to the moving parison mold. It is to be further noted that valve 120 is set to a pressure such that the pressure in 176 is less than the blowing pressure so as not to interfere with the blow molding operation.

In effecting the translational movement of the parison mold, rack 143 is telescoped into bracket 140 by the rotation of 139. Further motor 131 continues to rotate the parison mold so that molecular orientation is continuously imparted to the parison 43.

A break in the thermoplastic material 154 is shown at reduced orifice portion 151a, indicating that the plasticizer has sucked back the thermoplastic material in preparation for the next injection cycle. This suck back injection operation is more fully described in U.S. Pat. No. 3,709,644.

Referring now to FIG. 6, the blow molding operation is shown as being completed, and the parison is now blown to the desired container 19. The entire parison body has undergone double helicoidal molecular orientation by virtue of the rotational movements of the core rod and parison mold, and further assisted by the translational movement of the parison mold. Parison mouth portion 43a remains embedded between the mold walls 20a2, 20b2 and the ring portion 64 during the entire blow molding, and as such the orientation to this small portion 43a would generally be less than that to the large container portion.

The top mold platen 180 forcibly holds mold section 20a against mold section 20b during injection and blow molding. Insofar as the only injection force exerted on section 20a is at the minimal surface are 20a2, and insofar as the blow pressures as usually not relatively large, the force required to exerted by platen 180 is not great and significantly less than that generally required by platens to mold containers of the size under consideration. As such, a plurality of container forming molds may be housed in one set of platens as depicted in FIGS. 1 and 3.

Also noted in FIG. 3 is that valve 120 is fully seated in cup 122, and the valve head 120a, flange wall 104a and bar wall 153 compris the bottom wall in forming the container 19.

Ring 65 is shown fully seated against flange 63 in preparation for the next injection cycle.

Rack 138 is shown in its fully telescoped position and must be returned to the position of FIG. 4 in preparation for the next injection cycle.

Mold section 20a and 20b are formed with through holes 20a4 and 20b4 for passing cooling fluid through the mold section to assist in cooling the container before lifting section 20a from section 20b and transporting the core rod and container to the stripping station.

Referring now to FIG. 3 there is shown the adaptation of the present invention to a three station machine 200. Machine 200 comprises a container forming station 201 which is similar in construction and operation to the apparatus of station 15 heretofore described; an intermediate station 202; and a stripping station 203 which is similar in construction and design to the stripping station 18.

Intermediate station 202 may serve several functions such as cooling the container, imprinting the container and the like.

The indexing head 204 with core rods 205, is of triangular configuration, and rotates the core rods from station 201 to 202, to 203 and returned to 201. This triangular head configuration is known in conventional injection blow molding machines. As such the arrangement of FIG. 3 represents the adaptation of a conventional triangular indexing head with the apparatus of the present invention. Of course the heavy injection platens need not necessarily be employed.

In operation the core rod 13 is indexed in mold sections 20a and 20b and the mold section 20a clamped on section 20b. The parison mold 41 is then translationally moved to encompass the core rod 13 will leaving the measured cavity for the parison 43. Ring 66 is seated with core rod flange 63 in preparation for injection molding. The plasticizer 32 and screw extruder 33 in timed operation provide fluent thermoplastic material 154 to form the parison 43. With the parison formed, cooling fluid is provided within the parison mold and the core rod to rapidly bring the parison to its orientation temperature, and the core rod and parison mold are rotated to impart molecular orientation to the parison. With molecular orientation effected blow air is provided to blow the parison as the parison mold is retracted so as to expose the oriented parison to the container mold cavity. The container is then fully formed in the mold cavity, and the mold opened to subsequently strip the container from the core rod.

In thermoplastics not undergoing orientation, the parison cooling is usually necessary to call the parison to the desired blow molding temperature.

It is to be noted that the clamping force exerted on mold sections 20a and 20b need only be that force necessary to hold the mold sections closed under the relatively modest force exerted in blow molding. The injection molding force which is quite substantial at several thousand pounds per square inch, is exerted within the cylindrical parison mold and core rod, and core rod support. The only portions of the container molds that must take such pressures in the very small areas of portions 20a2 and 20b2. Therefore in view of the fact that the mold clamps need only exert a relatively modest force to hold the clamps closed, throughout the container formation, it is now possible to provide a plurality of container forming molds within under single clamp force as shown in FIGS. 1 and 3.

It is thusly shown that in the orientation of the wide mouth container essentially the entire container has undergone orientation, with perhaps the only portion not fully oriented being the lip or mouth of the container.

Although specific embodiments of the invention have been described, modifications and changes may be made therein without departing from the scope of the invention as defined in the appended claims.

What is claimed is:

1. An apparatus for making a wide mouth container comprising means to injection mold a parison in a parison mold having a mouth portion and a body portion with said mouth portion having a greater diameter than said body portion, said parison mold comprising a movable mold means, a container mold, said parison mold comprising a cylindrical member and a core rod disposed in said parison mold so as to form a cavity therebetween in which the parison is molded, and means to move said parison mold comprising means to move said cylindrical member along said core rod so as to permit the parison to be formed against the walls of the container mold, said cylindrical member being formed with a flange, and a flange surrounding said core rod and being opposed to said cylindrical member flange so as to form a parison portion interconnecting the parison mouth portion and the parison body portion, and means to blow mold the parison to form the container and means to move said parison mold and said cylindrical member flange to permit the parison to be blow molded against the inside of the container mold and the cylindrical member flange, further comprising means operably associated with said cylindrical member flange to provide fluid pressure between the cylindrical member and the parison.

2. The apparatus of claim 1, further comprising means operatively associated with the said cylindrical member to rotate the cylindrical member.

3. The apparatus of claim 1, further comprising means on at least one of said core rod and parison mold operatively associated with said mold to condition the parison to a desired temperature.

4. The apparatus of claim 3, further comprising means operatively associated with said core rod to rotate the core rod.

5. The apparatus of claim 4, wherein said means to blow mold the body portion further comprises means to form said interconnecting parison portion in contact with the container mold.

6. The apparatus of claim 5, wherein the means to blow the parison comprises a blowing fluid inlet formed between the core rod and the flange surrounding the core rod.

7. The apparatus of claim 3, wherein said conditioning means comprises means to flow a temperature conditioning fluid within the core rod, and means to flow a temperature conditioning fluid within the cylindrical member.

8. An apparatus for making a wide mouth container comprising means to injection mold a parison in a parison mold having a mouth portion and a body portion with said mouth portion having a greater diameter than said body portion, said parison mold comprising a movable mold means, a container mold, said parison mold being positionable within said container mold, said parison mold comprising a cylindrical member and a core rod disposed in said parison mold so as to form a cavity there-between in which the parison is molded, and means to move said parison mold comprising means to move said cylindrical member along said core rod so as to permit the parison to be formed against the walls of the container mold, said cylindrical member being formed with a flange, and a flange surrounding said core rod and being opposed to said cylindrical member flange so as to form a parison portion interconnecting the parison mouth portion and the parison body portion and means to blow mold the parison to form the container and means to move said parison mold to permit the parison to be blow molded against the inside of the container mold, further comprising valve means operably associated and mounted with said cylindrical member to provide fluid pressure between the cylindrical member and the parison so that said valve means communicates between the space between the parison and the cylindrical member and the ambient environment outside the container mold.

* * * * *